Nov. 6, 1951  A. B. WEISLER  2,574,075
BASEBOARD FOR ELECTRICAL OUTLETS
Filed Sept. 28, 1949  2 SHEETS—SHEET 1
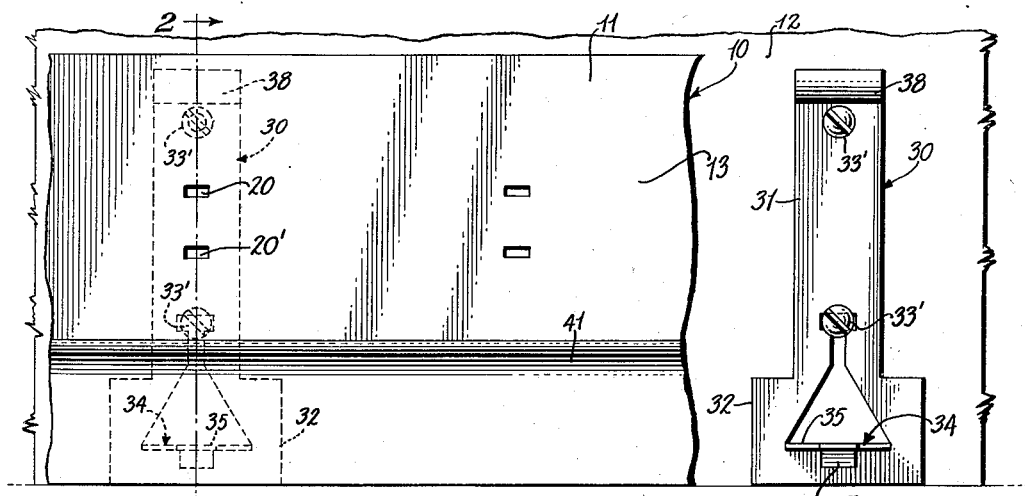
Fig. 1
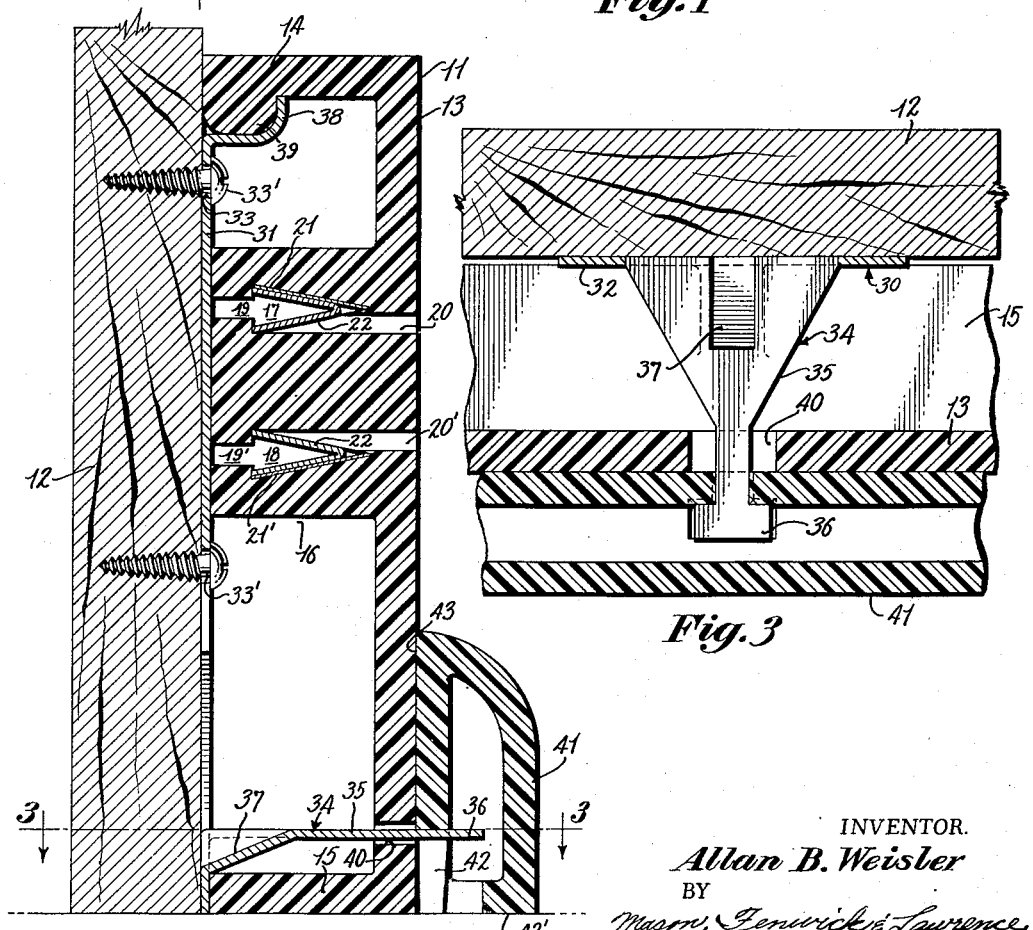
Fig. 2
Fig. 3
INVENTOR.
Allan B. Weisler
BY
Mason, Fenwick & Lawrence
Attorneys Nov. 6, 1951 — A. B. WEISLER — 2,574,075
BASEBOARD FOR ELECTRICAL OUTLETS
Filed Sept. 28, 1949 — 2 SHEETS—SHEET 2
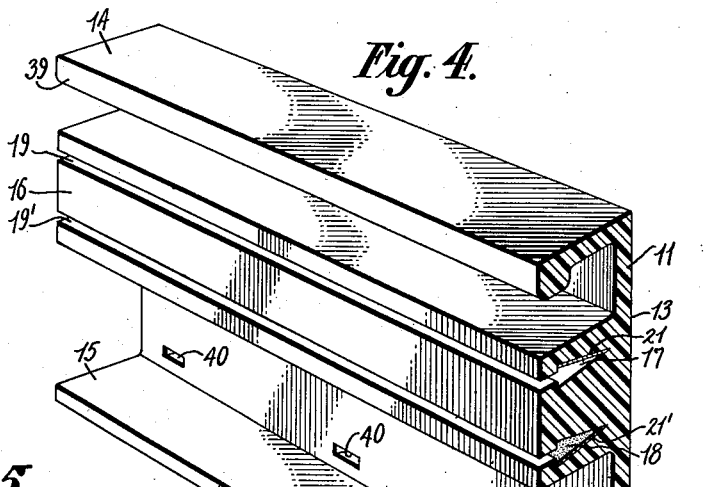
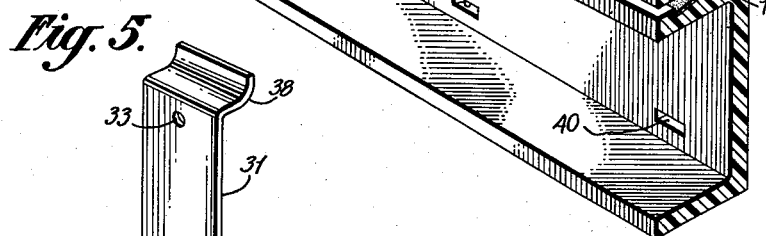
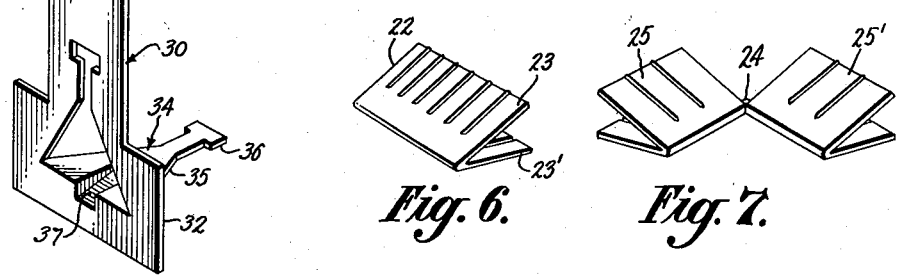
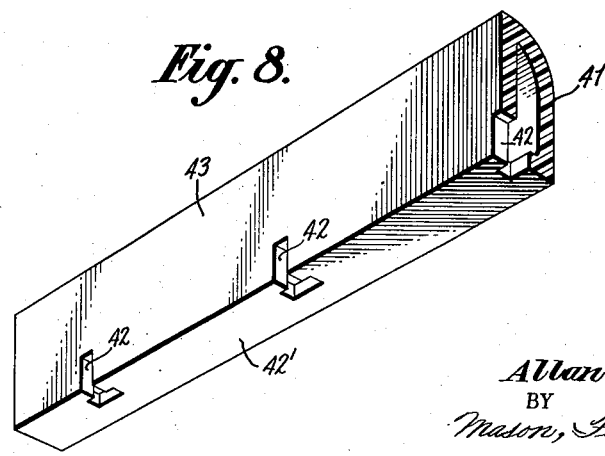
INVENTOR.
Allan B. Weisler
BY
Mason, Fenwick & Lawrence
Attorneys

Patented Nov. 6, 1951

2,574,075

UNITED STATES PATENT OFFICE 2,574,075

BASEBOARD FOR ELECTRICAL OUTLETS

Allan B. Weisler, New Orleans, La.

Application September 28, 1949, Serial No. 118,431

9 Claims. (Cl. 173—334.1)

1

This invention relates, in general, to a baseboard mold unit for building interiors having a plurality of electrical outlet sockets combined integrally therewith internally of the baseboard, and more particularly to a baseboard for residential and commercial interiors which is detachably mounted at the floor level to the walls of such interiors and is provided with a series of spaced electrical outlet sockets intercoupled in series electrical relation internally of the baseboard.

It has been the conventional practice heretofore, to provide for floor level electrical outlet sockets in the baseboard mold of residential or commercial building interiors by cutting suitable openings in the baseboard mold panel spaced along the length of the mold and mounting electrical outlet fixture housings therein, each as an individual attached unit within the baseboard mold panel. The contact terminals of these electrical outlet units are intercoupled in a desired manner by appropriate wiring disposed behind the baseboard mold coupling the contacts of the outlet socket with the electrical supply line. There are many disadvantages incident to this type of floor level electrical outlet socket arrangement. Particularly, the provision of the outlet sockets in housings of dissimilar material than that of which the baseboard mold is constructed, in a suitable recess cut through the baseboard mold, and covered by a plastic or other ornamental covering element, presents an unsightly appearance as it interrupts the normal uniform face of the baseboard mold and constitutes unsightly offsets projecting out of the normal plane of the face of the baseboard mold. Likewise, provision of such prior art electrical outlet sockets in a baseboard mold involves the operations of cutting the appropriate opening or recess in the baseboard mold and wiring the floor level outlet contacts with the supply line, usually requiring the services of a skilled electrician.

It is an object of the present invention to provide a novel baseboard mold unit for building interiors having a spaced series of floor level electrical outlets disposed at intervals along the length of the baseboard and formed integrally therewith, adapted to overcome the above discussed disadvantages.

Another object of the present invention is the provision of a novel baseboard mold unit for building material having a system of spaced electrical outlet sockets integrally incorporated therein, which is attractive in appearance, and which unit is readily attachable to any building

2 surface by selectively detachable fastenings not visible externally of the assembled baseboard mold unit.

Another object of the present invention is the provision of a novel baseboard mold for building interiors which is provided with an integrally incorporated plurality of electrical outlet contacts so arranged as to afford a continuous series of outlets at spaced intervals along the entire length of each baseboard mold unit.

Another object of the present invention is the provision of a novel baseboard mold for building interiors having integrally combined therewith an internally arranged series of electrical outlet contacts spaced at intervals along the length thereof, which combined baseboard mold and electrical outlet sockets are readily positionable as a unit on the surface of the building interior with which it is to be associated.

Another object is the provision of a novel baseboard mold for building interiors having a plurality of series intercoupled electrical outlet contacts forming electrical convenient outlet sockets spaced at uniform intervals along the length of the baseboard mold and which are readily intercoupled with a source of electrical supply to supply the electrical energy to all of the electrical outlet contacts.

Other objects, advantages, capabilities of the present invention will become apparent from the following detailed description taken in conjunction with the accompanying drawings, showing only a preferred embodiment of the invention, wherein:

Figure 1 is a front elevation of a baseboard mold for building interiors, embodying the present invention, showing a part of the baseboard mold broken away to disclose the structure of the mounting bracket therefor;

Figure 2 is a vertical transverse section of the baseboard mold for building interiors embodying the present invention, taken along the lines 2—2 of Figure 1;

Figure 3 is a horizontal transverse section of the instant baseboard mold for building interiors, taken along the lines 3—3 of Figure 2;

Figure 4 is a perspective view of a portion of the main baseboard mold panel taken from the rear of the panel, showing the details of the formation and internal arrangement thereof;

Figure 5 is a perspective view of the wall mounting bracket of the instant baseboard mold unit;

Figure 6 is a perspective view of a V-shaped spring contact employed in the present invention to provide electrical coupling at the floor level convenient sockets between an electrical contact plug blade and the electrical source wires or supply line for the building;

Figure 7 is a perspective view of a right-angle V-shaped spring contact for electrically intercoupling the respective sectional units of the baseboard mold at the corners of the building interiors; and Figure 8 is a perspective view of an elongated section of the toe molding strip for the baseboard mold unit.

Referring now to the drawings wherein like reference characters designate corresponding parts throughout the several figures, the combined electrical outlet and baseboard mold, generally indicated at 10, is formed of a main baseboard panel 11 substantially rectangular in character and adapted to be disposed along the base of the wall, indicated at 12, of a building interior at floor level. The main baseboard panel 11 is formed of a suitable commercially marketed variety of insulating plastic molded so as to form a front planar face 13 rearwardly of which extend top and bottom flanges 14 and 15 and an intermediate conduit housing portion 16, the latter of which is adapted to carry the various electrical conductor and contact elements.

The conduit housing portion 16 is provided internally thereof with two vertically spaced conduit channels 17 and 18 of triangular cross-sectional configuration extending the length of the main baseboard panel 11. These triangular channels 17 and 18 are disposed so that their apices are directed toward the front face 13 of the main panel 11 and their bases are disposed toward the rearmost surface of the conduit housing 16. Constricted, rearwardly opening slots 19, 19' extend from the mid-point of the bases of the triangular conduit channels 17 and 18 through the rearmost surface of the conduit housing 16 and are coextensive with the channels 17 and 18, to provide access to the channels at any point along their length from the rear of the conduit housing portion.

At uniformly spaced intervals along the length of the main panel 11 of the baseboard mold, vertically aligned substantially rectangular receptacle orifices 20, 20' are formed extending through the front face 13 of the main panel 11 and into the triangular or V-shaped portions of the elongated conduit channels 17 and 18. These orifices 20, 20' are of proper size and spacing to receive the contactor blades or prongs of a conventional electrical appliance plug, and are of such a depth as to dispose the inner ends of the contactor blades within the triangular or V-shaped portions of the elongated channels 17 and 18.

To supply electrical energy to the areas adjacent the baseboard outlet orifices 20, 20', the upper and lower faces of the triangular or V-shaped areas of the elongated channels 17 and 18, respectively, are coated continuously along their length with a metallic composition or metallic suspension paint, indicated at 21 and 21' of conventional commercial varieties, having properties of good adhesion characteristics and high electrical conductivity. The metallic paint at 21 and 21' on the faces of the triangular or V-shaped portions of the channels 17 and 18 form electrical conductive coating strips extending the entire length of the main baseboard panel 11, forming electrical buss bars or conduits which may be tapped at any point along the length of the main baseboard panel. Within the triangular or V-shaped areas of the slots 17 and 18, V-spring contactors 22, illustrated in Figure 6, are disposed, as by forcing the V-shaped spring strips 22, by means of a screw driver blade, through the rectangular constricted slots 19, 19' of the channels 17 and 18 and into the V-shaped areas. Within the V-shaped areas of the channels, the resiliency of the V-shaped spring tends to separate the legs 23 and 23' and permits the spring contacts 22 to be lodged securely within the triangular areas of the channels 16 and 17, the ends of the legs 23 and 23' abutting against the shoulders at the base of the triangular areas and the apex of the contactor lodging in the apex of the triangular areas of the channels. These spring contacts are disposed within the triangular areas of the channels 17 and 18 in the areas where the electrical outlet receptacle orifices 20, 20' join the triangular areas of the channels 17 and 18 so that the inner ends of the blades of the electrical appliance plugs will be electrically coupled with the V-shaped spring contacts. The legs 23, 23' of the V-shaped spring contacts may be cut or otherwise formed into an interrupted series of strips extending toward the base of the V to improve their contact characteristics.

V-shaped contact springs 22 may be likewise disposed at the end of the main panel 11 or some convenient location along the length thereof within the triangular areas of the channels 17 and 18, which springs 22 are intercoupled with the lead ends of the electrical source wires or supply line (not shown) as by soldering or the like, to supply electrical current to the spaced pair of conductor coating strips at 21, 21' on the upper and lower faces of the elongated channels 17 and 18, respectively. In this manner, the electrical energy will be transmitted through the metallic coating strips 21, 21' to the V-shaped spring contacts 22 disposed at each of the electrical outlet receptacle orifices 20, 20' disposed along the length of the main baseboard panel 11.

Right-angular V-shaped contact springs 24, shown in Figure 7, consisting of two sections 25, 25' intercoupled along their apices, each substantially identical to the V-shaped springs 22, are provided to intercouple the conduit channels 17 and 18 in respective baseboard panel sections at the corners of the room. These function in substantially the same manner as the contacts 22, but intercouple electrical current supplied to the metallic conductive coatings 21, 21' in the baseboard section connected to the supply line, with corresponding metallic conductive coatings in the remaining baseboard sections in the building material.

This assembled unit of the main baseboard panel 11 and the baseboard electrical outlet sockets formed at the receptacle orifices 20 and 20' are adapted to be detachably mounted as a unit on the wall 12 of the building interior with which the baseboard is to be associated by means of a convenient mounting bracket. This mounting bracket, generally indicated at 30, and shown in detail in Figures 1 to 3 and 5, comprises a vertically extending arm 31 and a base portion 32 of laterally extending rectangular configuration. The baseboard mounting bracket 30 is provided with an aperture 33 near the top thereof adapted to receive a suitable screw or like fastening element therethrough, as illustrated at 33', for securing the bracket to the wall 12 of the building interior. The base 32 of the bracket 30 is provided with a tongue 34, cut and bent outwardly at right angles to the body of the bracket 30, having a triangular base 35 converging into a narrow T-shaped lip 36 at the end thereof. The T-shaped cut out or opening, indicated at 36', remaining in the body of the bracket 30 in the vertical portion 31 thereof forms a suitable aperture through which another securing element such as a wood screw 33' or the like, may be inserted to rigidly mount the bracket on the wall 12 of the building interior. A suitable channel 37 may be pressed out of the triangular base 35 to retain the tongue 34 perpendicular to the bracket base 32.

The upper end of the vertical portion 31 of the bracket 30 is provided with a forwardly flared shoulder or hook 38, adapted to receive a downwardly extending projection 39 of substantially corresponding shape at the rear end of the top flange 14 of the main baseboard panel 11, to retain the top of the main baseboard panel 11 in position against the wall 12 of the building interior. Apertures 40 of substantially the vertical transverse cross sectional shape of the T-shaped lip 36 of the tongue 34 on the bracket 30 are adapted to receive the ends of the T-portions 36 on the mounting brackets therethrough so that the T extends entirely forward of the front face 13 of the main baseboard panel 11.

To clamp the main baseboard panel securely in position, a toe molding strip 41 is provided, likewise formed as by molding of an electrically insulating plastic material, and provided with spaced slots 42 of a horizontal T-shaped cross section corresponding with the T-shaped lip 36 on the mounting bracket tongue 34. These T-shaped slots 42 in the toe molding strip 41 extend only a short distance upwardly from the bottom of the toe molding strip. The toe molding strip 41 is adapted to be fitted down over the protruded T-shaped lips 36 to a position such that its bottom 42' is flush with the floor of the building interior and its rearwardly disposed face 43 bears against the front face 13 of the main baseboard panel 11 to retain the baseboard panel securely located in position against the wall 12.

It will be apparent, therefore, that a novel baseboard mold for building interiors having electrical outlet receptacles formed integrally therewith extending at uniformly spaced intervals along the length of the baseboard mold has been provided, wherein the entire unit may be readily detachably secured to the wall of the building interior with which it is to be associated. The novel mounting bracket and clamping toe molding strip assembly provides a readily detachable unit to permit easy repairing or replacement of the baseboard mold or electrical outlet therein. This unit presents a particularly attractive appearance. The electrical outlet receptacles appear only as spaced pairs of receptacle orifices extending through the unbroken outer face of the main baseboard panel. The present unit may be readily adapted for any size building interior wall, as the assembled main baseboard mold and electrical outlet receptacle may be fabricated in sections of uniform length or may be cut to the length of the walls.

While I have particularly shown and described but one specific embodiment of the invention, it is distinctly understood that the invention is not limited thereto, but that various modifications may be made in the invention without departing from the spirit and scope thereof, and it is desired, therefore, that only such limitations shall be placed thereon as are imposed by the prior art and are set forth in the appended claims.

What is claimed is:

1. An electrical conduit molding comprising, an elongated molding panel of insulating material having a rearwardly disposed conduit housing coextensive therewith, a pair of vertically spaced conduit channels internally disposed within said conduit housing and extending substantially the length thereof, each of said channels being provided with a constricted elongated slot opening through the rear of said conduit housing, a continuous coating strip of electrically conductive material disposed in each of said conduit channels coextensive with said channels to be coupled across an electrical supply line, intermittently spaced vertical pairs of orifices extending from said channels through the front of said panel adapted to receive prongs of electrical appliance plugs, and resilient conductive contact elements selectively positionable in said conduit channels by insertion through said constricted slots to be engaged by the ends of said prongs when inserted fully within said orifices and electrically intercouple said prongs with said coating strips.

2. An electrical conduit baseboard molding for building interiors comprising, an elongated molding panel of insulating material having a planar front face and a rearwardly disposed conduit housing, a pair of vertically spaced conduit channels triangular in cross section with their apices directed forwardly of said panel internally disposed within said conduit housing and coextensive therewith, each of said channels being provided with a constricted elongated slot opening through the rear of said conduit housing, a continuous coating strip of electrically conductive material disposed in each of said conduit channels on the upper and lower surfaces thereof respectively to be intercoupled with an electrical supply line, vertical pairs of orifices intermittently spaced longitudinally of said panel extending from said channels through the front of said panel and adapted to receive prongs of electrical appliance plugs, and electrically conductive V-shaped spring contacts selectively insertable in said conduit channels through said elongated slots with their apices directed forwardly of said panel, said spring contacts being disposed to be engaged by the ends of said prongs when inserted fully within said orifices to electrically intercouple said prongs with said coating strips.

3. An electrical conduit baseboard molding for building interiors comprising, an elongated molding panel of insulating material having a planar front face and a rearwardly disposed conduit housing, a pair of vertically spaced conduit channels triangular in cross section with their apices directed forwardly of said panel internally disposed within said conduit housing and coextensive therewith, each of said channels being provided with a constricted elongated slot opening through the rear of said conduit housing, a continuous conductive coating formed on the upper and lower faces of the conduit channels respectively by a suspension of electrically conductive particles in a suitable carrier vehicle to be coupled across an electrical supply line, vertical pairs of orifices intermittently spaced longitudinally of said panel extending from said channels through the front of said panel and adapted to receive prongs of electrical appliance plugs, and electrically conductive V-shaped spring contacts selectively insertable in said conduit channels through said elongated slots with their apices directed forwardly of said panel, said spring contacts being disposed to be engaged by the ends of said prongs when inserted fully within said orifices to electrically intercouple said prongs with said conductive coating.

4. An electrical conduit baseboard molding for building interiors comprising, an elongated molding panel of insulating material having a planar front face and a rearwardly disposed conduit housing, a pair of vertically spaced conduit channels triangular in cross section with their apices directed forwardly of said panel internally disposed within said conduit housing and coextensive therewith, each of said channels being provided with a constricted elongated slot opening through the rear of said conduit housing, a continuous electrically conductive coating of metallic paint disposed in each of said conduit channels along one wall thereof to be coupled across an electrical supply line, vertical pairs of orifices intermittently spaced longitudinally of said panel extending from said chanels through the front of said panel and adapted to receive prongs of electrical appliance plugs, and electrically conductive V-shaped spring contacts selectively insertable in said conduit channels through said elongated slots with their apices directed forwardly of said panel, said spring contacts being disposed to be engaged by the ends of said prongs when inserted fully within said orifices to electrically intercouple said prongs with said conductive coating.

5. An electrical conduit molding comprising, an elongated molding panel of insulated material, a pair of vertically spaced conduit channels internally disposed within said molding panel and extending substantially the length thereof, each of said channels being provided with a constricted elongated slot opening through the rear of said panel, electrically conductive conduit means disposed within each of said channels substantially coextensive therewith to be coupled across an electrical supply line, spaced pairs of orifices extending from said channels through the front of said molding panel adapted to receive prongs of electrical appliance plugs, electrically conductive contact members disposed in said conduit panel to contact the ends of said prongs extending through said orifices and electrically intercouple said prongs with said electrically conductive means, bracket means adapted to be secured to a wall on which the conduit molding is to be mounted having locking means thereon disposed to extend through corresponding apertures in said panel and outwardly thereof, and an auxiliary molding strip having means thereon to engage said locking means to fixedly retain said panel against the wall.

6. An electrical conduit baseboard molding for building interiors comprising, an elongated molding panel of insulating material having a planar front face and a rearwardly disposed conduit housing, a pair of vertically spaced conduit channels triangular in cross section with their apices directed forwardly of said panel internally disposed within said conduit housing and coextensive therewith, each of said channels being provided with a constricted elongated slot opening through the rear of said conduit housing, a continuous coating strip of electrically conductive material disposed in each of said conduit channels on the upper and lower surfaces thereof respectively to be electrically intercoupled with an electrical supply line, vertical pairs of orifices intermittently spaced longitudinally of said panel extending from said channels through the front of said panel and adapted to receive prongs of electrical appliance plugs, electrically conductive V-shaped spring contacts selectively insertable in said conduit channels through said elongated slots with their apices directed forwardly of said panel, said spring contacts being disposed to be engaged by the ends of said prongs when inserted fully within said orifices to electrically intercouple said prongs with said coating strips, bracket means adapted to be secured to a wall on which the conduit molding is to be mounted having locking means thereon disposed to extend through corresponding apertures in said panel and outwardly thereof, and an auxiliary molding strip having means thereon to engage said locking means to fixedly retain said panel against the wall.

7. An electrical conduit baseboard molding for building interiors comprising, an elongated molding panel of insulating material having a planar front face and a rearwardly disposed conduit housing, a pair of vertically spaced conduit channels triangular in cross section with their apices directed forwardly of said panel internally disposed within said conduit housing and coextensive therewith, each of said channels being provided with a constricted elongated slot opening through the rear of said conduit housing, a continuous coating strip of electrically conductive material disposed in each of said conduit channels on the upper and lower surfaces thereof respectively to be electrically intercoupled with an electrical supply line, vertical pairs of orifices intermittently spaced longitudinally of said panel extending from said channels through the front of said panel and adapted to receive prongs of electrical appliance plugs, electrically conductive V-shaped spring contacts selectively insertable in said conduit channels through said elongated slots with their apices directed forwardly of said panel, said spring contacts being disposed to be engaged by the ends of said prongs when inserted fully within said orifices to electrically intercouple said prongs with said coating strips, bracket means adapted to be secured to a building interior wall having a retaining tongue thereon adapted to extend through a corresponding aperture in said elongated panel, and an auxiliary molding strip having a locking recess adapted to receive a locking projection on the end of said tongue to removably retain said molding panel against the building interior wall.

8. An electrical conduit molding comprising, an elongated molding panel of insulated material, a pair of vertically spaced conduit channels internally disposed within said molding panel and extending substantially the length thereof, each of said channels being provided with a constricted elongated slot opening through the rear of said panel, electrically conductive conduit means disposed within each of said channels substantially coextensive therewith to be coupled across an electrical supply line, spaced pairs of orifices extending from said channels through the front of said molding panel adapted to receive prongs of electrical appliance plugs, electrically conductive contact members disposed in said conduit channels to contact the ends of said prongs extending through said orifices and electrically intercouple said prongs with said electrically conductive means, bracket means adapted to be secured to a building interior wall having a retaining tongue thereon adapted to extend through a corresponding aperture in said elongated panel, and an auxiliary molding strip having a locking recess adapted to receive a locking projection on the end of said tongue to removably retain said molding panel against the building interior wall.

9. An electrical conduit baseboard molding for building interiors comprising, an elongated molding panel of insulating material having a planar front face and a rearwardly disposed conduit housing, a pair of vertically spaced conduit channels triangular in cross section with their apices directed forwardly of said panel internally disposed within said conduit housing and coextensive therewith, each of said channels being provided with a constricted elongated slot opening through the rear of said conduit housing, a continuous coating strip of electrically conductive material disposed in each of said conduit channels on the upper and lower surfaces thereof respectively to be electrically intercoupled with an electrical supply line, vertical pairs of orifices intermittently spaced longitudinally of said panel extending from said channels through the front of said panel and adapted to receive prongs of electrical appliance plugs, electrically conductive V-shaped spring contacts selectively insertable in said conduit channels through said elongated slots with their apices directed forwardly of said panel, said spring contacts being disposed to be engaged by the ends of said prongs when inserted fully within said orifices to electrically intercouple said prongs with said coating strips, bracket means adapted to be secured to a building interior wall having a retaining tongue thereon adapted to extend through a corresponding aperture in said elongated panel, and an auxiliary molding strip having a locking recess adapted to receive a locking projection on the end of said tongue to removably retain said molding panel against the building interior wall.

ALLAN B. WEISLER.

REFERENCES CITED

The following references are of record in the file of this patent:

UNITED STATES PATENTS

| Number | Name | Date |
| --- | --- | --- |
| 1,958,993 | Friend | May 15, 1934 |
| 1,962,554 | De Mask | June 12, 1934 |
| 2,190,196 | Semenyna | Feb. 13, 1940 |
| 2,478,006 | Paden | Aug. 2, 1949 |